United States Patent [19]
Winks et al.

[11] Patent Number: 5,756,046
[45] Date of Patent: May 26, 1998

[54] FUMIGATION OF PARTICULATE COMMODITIES

[75] Inventors: Robert Gordon Winks, Sunshine Coast; Aleck James Hunter, Dingley, both of Australia

[73] Assignee: Commonwealth Scientific and Industrial Research Organisation, Australian Capital Territory, Australia

[21] Appl. No.: 564,349

[22] PCT Filed: Jun. 15, 1994

[86] PCT No.: PCT/AU94/00324

§ 371 Date: Jun. 25, 1996

§ 102(e) Date: Jun. 25, 1996

[87] PCT Pub. No.: WO94/28746

PCT Pub. Date: Dec. 22, 1994

[30] Foreign Application Priority Data

Jun. 15, 1993 [AU] Australia ............... PL9442/93

[51] Int. Cl.$^6$ ........................................ A61L 9/00
[52] U.S. Cl. ................... 422/32; 43/125; 422/3; 422/28; 422/40; 422/292
[58] Field of Search ..................... 422/28, 32, 3, 422/40, 292, 305; 43/125

[56] References Cited

U.S. PATENT DOCUMENTS 4,966,755 10/1990 Smith .................. 422/28
5,417,921 5/1995 Dove et al. ............ 422/30

FOREIGN PATENT DOCUMENTS 640669 1/1991 Australia.
WO 9100017 1/1991 WIPO.

OTHER PUBLICATIONS

Hunter, "Pressure Difference Across an Aerated Seed Bulk for Some Common Duct and Store Cross-Sections", *J. Agric. Engng. Res.*, 28:437–450 (1983).

Primary Examiner—Krisanne Thornton
Attorney, Agent, or Firm—Sughrue, Mion, Zinn, Macpeak & Seas, PLLC

[57] ABSTRACT

When fumigating a bulk particulate commodity stored in a top-vented vertical silo by slowly passing a gas containing a low concentration of a gaseous fumigant through the bulk mass, differences between the temperature, $T_g$, in the bulk mass and the ambient temperature, $T_a$, outside the silo cause a "chimney effect" within the silo, and possible unwanted dilution of the fumigant. The chimney effect also occurs in other top-vented storage structures containing particulate commodities. To overcome the chimney effect, the fumigant-containing gas is supplied through a duct to the base of the storage structure at a flow rate $Q_f$ (in m$^3$ sec$^{-1}$) determined by the relationship $$Q_f = \frac{g \times P_a}{R \times R_a} \times A \times \left| \frac{1}{T_a} - \frac{1}{T_g} \right|$$

where g is the acceleration due to gravity (approximately 9.8 m sec$^{-2}$); $P_a$ is the atmospheric pressure expressed in Pascals; $R_a$ is the gas constant for air (=287 J kg$^{-1}$ K$^{-1}$); $T_a$ is in K; $T_g$ is also in K; R is a resistance factor (in Pascals sec m$^{-2}$) which depends upon the nature of the commodity in the storage structure; and A is the horizontal cross-sectional area of the storage structure, in square meters. This technique can also be used to maintain effective fumigation of a plurality of storage structures in a storage facility, from a single source of gaseous fumigant.

18 Claims, 2 Drawing Sheets

FUMIGATION OF PARTICULATE COMMODITIES

TECHNICAL FIELD

This invention concerns the fumigation of stored particulate commodities that are susceptible to attack and spoilage by insect pests. It is particularly useful in the controlled fumigation of particulate foodstuff (for example, grain) that is stored in a vertical silo which is vented at the top. However, this invention is not limited in its application to foodstuffs, or to commodities stored in silos.

BACKGROUND OF THE INVENTION

A technique for the effective and efficient fumigation of grain, using low concentrations of phosphine as the fumigant gas, is described in the specification of International patent application No PCT/AU90/00268, which is WIPO Publication No 91/00017. That technique requires the establishment of a slight over-pressure of the fumigant-containing gas in the grain, to the extent that the fumigant-containing gas flows through the grain mass at a constant linear velocity and leaves the top surface of the grain in the silo at a velocity in the range of from $0.5 \times 10^{-4}$ to $2 \times 10^{-4}$ meters per second. The concentration of phosphine in the gas passing through the grain is in the range of from 4 to 200 micrograms per liter.

While that technique works well, further work in connection with its commercial adoption has shown that a problem arises when grain in a vertical silo is being fumigated and the temperature within the silo is different from the ambient air temperature outside the silo. When the temperature of the grain is greater than the outside ambient air temperature, the density of the air within the silo is less than the density of the air outside, and there is a tendency for the air inside the silo to rise. This phenomenon has been termed the "chimney effect". The difference in density between the air inside the silo and the air outside the silo produces a difference between the pressure gradient with height inside the silo and the pressure gradient with height outside the silo. Hence, in a top vented silo, the air pressure in the grain at the base of the silo will be different from the air pressure outside the silo at the level of the base of the silo.

In this situation, if the bottom of the silo is not completely sealed (in commercial silos, this is usually the case, for even notionally sealed bases contain cracks and crevices which permit the ingress of air), the chimney effect causes an airflow through a top vented silo. This flow of air through the silo will dilute the concentration of fumigant within at least part of the grain mass or other foodstuff stored in the silo, and may prevent effective fumigation of the stored product.

The same chimney effect occurs in other forms of storage structures which are vented at their tops and not completely sealed at their bases. Thus, for convenience, in the remainder of this specification (including the claims), the term "silo" will include within its scope any form of storage structure in which a particulate commodity may be stored.

DISCLOSURE OF THE PRESENT INVENTION

The prime object of the present invention is to provide a technique which compensates for the chimney effect, and prevents an undesirable dilution of fumigant during the fumigation of the charge of a top vented silo.

This objective is achieved by maintaining (and preferably continuously adjusting) the flow rate of the fumigant-containing gas so that, even when the chimney effect is present, there is sufficient fumigant gas present to ensure continuous fumigation of the stored product. It has been found that the required adjustment of the flow rate depends upon the difference between the temperature of the stored product and the ambient temperature outside the silo. Thus the necessary modification of the flow rate of the fumigant-containing gas to compensate for the chimney effect, by maintaining a small positive pressure of a predetermined concentration of fumigant within the grain mass or other stored product, can be determined from measurements or estimates of the temperatures within and outside the silo.

According to the present invention, a method of effective fumigation of a particulate commodity stored in a silo comprises the steps of (a) providing a supply of a fumigant-containing gas having a fumigant concentration which is effective to control insect pests in the stored commodity when applied to the stored commodity for an extended period; and (b) supplying the fumigant-containing gas to the base of the silo at a rate, $Q_f$, which, if the silo is full, is determined by the relationship $$Q_f = \frac{g \times P_a}{R \times R_a} \times A \times \left| \frac{1}{T_a} - \frac{1}{T_g} \right|$$

where $Q_f$ is expressed in $m^3 \ sec^{-1}$; g is the acceleration due to gravity (approximately 9.8 m sec$^{-2}$); $P_a$ is the atmospheric pressure expressed in Pascals; $R_a$ is the gas constant for air (=287 J kg$^{-1}$ K$^{-1}$); $T_a$ is the temperature of the air outside the silo, expressed in K; $T_g$ is the temperature of the commodity within the silo, also in K; R is a resistance factor (in Pascals sec m$^{-2}$) which depends upon the nature of the stored commodity in the silo; and A is the horizontal cross-sectional area of the silo, in $m^2$.

Also according to the present invention, apparatus for fumigating a particulate commodity stored in a silo comprises (a) means for pumping a fumigant-containing gas into the base of the silo;

(b) a first temperature sensing device positioned within the commodity in the silo and having a first output signal indicative of the temperature within the stored commodity;

(c) a second temperature sensing device positioned outside the silo and having a second output signal indicative of the ambient temperature outside the silo;

(d) processing means adapted to receive said first and second output signals and generate at least one control signal; said at least one control signal being input to control means; said control means being adapted to control the rate at which said gas pumping means pumps the fumigant-containing gas so that the rate of flow of the fumigant-containing gas into the silo has a value, $Q_f$, which, if the silo is full, is determined by the relationship $$Q_f = \frac{g \times P_a}{R \times R_a} \times A \times \left| \frac{1}{T_a} - \frac{1}{T_g} \right|$$

where $Q_f$ is expressed in $m^3 \ sec^{-1}$; g is the acceleration due to gravity (approximately 9.8 m sec$^{-2}$); $P_a$ is the atmospheric pressure expressed in Pascals; $R_a$ is the gas constant for air (=287 J kg$^{-1}$ K$^{-1}$); $T_a$ is the temperature of the air outside the silo, expressed in K; $T_g$ is the temperature of the commodity stored within the silo, also in K; R is a resistance factor (in Pascals sec m$^{-2}$) which depends upon the nature of the commodity stored in the silo; and A is the horizontal cross-sectional area of the silo, in m$^2$.

The resistance factor R, as noted above, is dependent on the nature of the commodity stored in the silo and the way in which it has been stored. For loosely packed wheat, the constant R is about 3100, while for closely packed wheat, it has a value of approximately 4000. The resistance factor, R, is well-known to agricultural engineers, having been determined experimentally for a number of different cereal grains and other commodities. In fact, one of the present inventors (Dr A J Hunter) has tabulated values for the factor R for a number of seed commodities in Table 2 of his paper entitled "Pressure Difference across an Aerated Seed Bulk for some Common Duct and Storage Cross-sections", which was published in the *Journal of Agricultural Engineering Research*, Volume 28, pages 437 to 450, 1983. The contents of that paper are incorporated into this specification by this reference to that paper. Relevant data from said Table 2, for commodities other than wheat, are reproduced (also in tabular form) below

| Commodity | Moisture Content | R (in Pa s m$^{-2}$) |
|---|---|---|
| Alfalfa | 7% | 16,318 |
| Barley | 12% | 1,676 |
| Clover, alsike | dry | 27,263 |
| Clover, crimson | 8% | 10,455 |
| Clover, red | dry | 17,626 |
| *Corn, clean ear | 16% | 6.19 |
| **Corn, ear, as harvested | 20% | 128 |
| Corn, shelled | 12.4% | 719 |
| Fescue | 11% | 4,722 |
| Flax | 11% | 10,421 |
| Grass seed, brome | 10.5% | 1,535 |
| Grass seed, rescue | 13% | 709 |
| Kobe Lespedeza | 15.5% | 3,167 |
| Lupin seed, blue | 7.5% | 512 |
| Oats | 13% | 1,816 |
| *Pea beans | 15% | 435 |
| *Peanuts in shell | 4.4% | 29.0 |
| Popcorn, shelled, yellow pearl type | 12% | 1,046 |
| Popcorn, white rice type | 14% | 1,766 |
| Rice, rough | 13% | 1,952 |
| Sericea Lespedeza | 13% | 16,318 |
| Sorghum, grain | 13% | 2,664 |
| Soybeans | 10% | 646 |
| Wheat | 11% | 3,131 |
| Linseed, glenelg | 7.9% | 14,907 |
| Rapeseed, tower | 5.7% | 7,097 |
| Safflower, gila | 5.9% | 1,207 |
| Sunflower, commercial crushing | 7.9% | 1,593 |

*Approximate value only as insufficient data were available to enable accurate values of R to be established directly in these cases.

The currently preferred fumigant for use with stored cereal grains and other particulate foodstuff is phosphine, although the present invention may be used with methyl bromide, carbonyl sulphide or any other suitable gaseous fumigant.

For a better understanding of the present invention, a more detailed description of the controlled fumigation method and examples of its practical implementation will now be provided.

DETAILED DESCRIPTION OF THE FUMIGATION METHOD

As the present invention has a major application to the fumigation of stored grain, the following description will concentrate on this application of the invention, although it is emphasised that the present invention may be used for the fumigation of any other particulate commodity that is stored in a vertical silo or in any other storage structure in which the chimney effect may occur.

Grain stored in a silo is essentially a porous mass. There are continuous air paths from the top of the grain mass to the bottom of the grain mass. If the silo is a top vented (or open topped) vertical silo, the bottom or base of which is completely sealed, the difference between the pressure at the bottom of the grain mass within the silo and the outside atmospheric pressure at the same level, known as the differential static pressure, $\Delta P_1$, is given by the relationship.

$$\Delta P_1 = \frac{g \times h \times P_a}{R_a} \times \left(\frac{1}{T_g} - \frac{1}{T_a}\right)$$

where $\Delta P_1$ is in Pascals; g is the acceleration due to gravity (9.8 m sec$^{-2}$); h is the height of the grain mass in meters; $P_a$ is the atmospheric pressure (in Pascals); $R_a$ is the gas constant for air (=287 J kg$^{-1}$ K$^{-1}$); $T_a$ is the ambient temperature outside (and thus adjacent to the top of) the silo, in K; and $T_g$ is the temperature of the grain, also in K.

If the bottom of the silo is completely leaky and air flows freely into the base of the silo, the differential static pressure (inside to outside) would be zero. If the bottom of the silo is partially sealed, the measured differential static pressure, $\Delta P_2$, at the base of the grain mass will be a value between zero and $\Delta P_1$. The ratio $\Delta P_2/\Delta P_1$ is therefore a measure of how well the bottom of the silo has been sealed.

If the grain temperature is greater than the temperature outside the silo and the bottom of the silo is not completely sealed, the chimney effect will cause air from outside the silo to flow into the base of the silo, to dilute the concentration of fumigant inside the silo. This ingress of air will cause the fumigation of the stored grain to fail, either totally or in part.

More generally, if the sealing of the silo at the top or the bottom is not specified, $\Delta P$ may be taken as the pressure difference between the inside and the outside of the sili, and $\Delta P_2$ is given by:

$$\Delta P_2 = |\Delta P_T - \Delta P_B|$$

where the pressure differences $\Delta P_T$ and $\Delta P_B$ are defined as pressure differentials, with reference to pressures inside the silo and outside the silo at the same level; $\Delta P_T$ is measured at the top of the silo; and $\Delta P_B$ is measured at the bottom or base of the silo.

Thus the flow of air within a full silo, due to the chimney effect, is given by $Q_c$, where $$Q_c = \frac{A}{R \times h} \times |\Delta P_1 - \Delta P_2|$$

where A is the cross-sectional area of the silo, in m$^2$; R is the grain resistance factor (which, as noted above, is about 3100 for loose wheat and about 4000 for packed wheat); h is the height of the silo in meters; and $Q_c$ is in m$^3$ sec$^{-1}$.

As the difference between the ambient temperature and the grain temperature changes, the flow due to the chimney effect will change and the pressure differentials will also change. Thus the flow of the fumigant-containing gas which is necessary to overcome the flow due to the chimney effect and just maintain the required small positive pressure within the grain mass will also change. The modified flow rate, as has been shown, may be determined from measurements of the temperature of the grain and the ambient temperature. To overcome the chimney effect flow, $Q_c$, a fumigant gas flow into the base of the silo at a rate of $Q_f$ is needed. This input flow will produce an escape (or grain face) velocity, $v_f$, expressed in m sec$^{-1}$, of:

$$v_f = \frac{g \times P_a}{R \times R_a} \times \left| \frac{1}{T_a} - \frac{1}{T_g} \right|$$

where $R_a$ is the gas constant for air, which is 287 J kg$^{-1}$ K$^{-1}$.

Hence the required flow, $Q_f$, of fumigant-containing gas for a full silo is given by:

$$Q_f = \frac{g \times P_a}{R \times R_a} \times A \times \left| \frac{1}{T_a} - \frac{1}{T_g} \right|.$$

As noted above, when operating a fumigation system for stored grain, the base of the silo is rarely completely sealed. Thus the formulae derived above will be applicable to almost all top vented silos and the flow rate of a fumigant-containing gas that is required to maintain the efficacy of the fumigation of the silo charge can be ascertained by the following steps:

(1) determine the average temperature of the grain, $T_g$, in K;

(2) determine the ambient temperature outside the silo, $T_a$, in K;

(3) determine the cross-sectional area of the silo in m$^2$; then (4) determine, using the above formula, the required flow rate $Q_f$.

If the grain is not cooled artificially and the fumigation system is required to run unattended, with a pre-determined steady flow of fumigant-containing gas that is maintained at all times, it will be necessary to obtain an estimate of the minimum outside (ambient) temperature, $T_a$, for the period of unattended fumigation. The maximum chimney effect will occur at this minimum value of $T_a$. The maximum value of the flow rate, $Q_f$, of the fumigant-containing gas, which will occur at this value of $T_a$, will then be calculated. If this maximum value of $Q_f$ is adopted for the fumigation system, at no time during the unattended fumigation will the concentration of fumigant fall below the required concentration that has been established from toxicology data.

In some grain storage facilities, the difference between the grain temperature, $T_g$, and the outside air temperature, $T_a$, may be positive or negative (for example, in geographical areas wheras the ambient temperature can be expected to exceed the temperature of grain stored in a vertical silo in the area, and in those instances where there is artificial cooling of grain stored in a vertical silo). When $T_a$ exceeds $T_g$, a negative chimney effect will occur in a silo that is not fully sealed at its top and bottom. With a negative chimney effect, the air flow through the silo will be downwards. In this situation, to achieve efficient unattended fumigation of the grain mass, a positive value of the flow rate $Q_f$ of the fumigant-containing gas, which will compensate for the maximum absolute value of the expected positive and/or negative chimney effects in the silo, is required and should be maintained at all times.

When minimum consumption of the fumigant is required while maintaining effective fumigation, the outside ambient temperature and the temperature of the grain mass should be monitored continuously and the flow rate adjusted, as necessary, to obtain the value of $Q_f$ calculated from the observed temperatures $T_a$ and $T_g$.

It should also be noted that when a variable (controlled) flow rate $Q_f$ is established for the fumigation of a particulate charge of a vertical silo, and the temperature of the silo charge (the grain mass) fluctuates between a value greater than the ambient temperature outside the silo and a temperature which is lower than the outside ambient temperature, a positive value of $Q_f$ should be established at all times.

In principle, a net flow rate through the grain mass of zero would not be detrimental to the fumigation of the grain. The required concentration of fumigant that is determined by toxicological considerations would be established in the grain mass before the flow of fumigant-containing gas ceases, and—ignoring the adsorption of fumigant by the grain, which is very low—would not be reduced.

Continuous control of the flow rate of fumigant-containing gas into a top vented silo can be effected manually (for example, by monitoring the difference between the temperature of the grain in a silo and the ambient air temperature outside the silo, then selecting—from a number of pre-set controlled flow rate values—the pre-determined flow rate value for the observed temperature difference). Such a manual control system, however, will rarely be the most cost-effective form of continuous control. Continuous control is preferably effected using a control mechanism which is responsive to signals generated by temperature sensors positioned within the grain and outside the silo. If desired, an average value of the grain temperature may be determined by positioning a number of sensors at different respective locations within the grain mass, and generating (by known means) an input signal for the control mechanism which is proportional to the difference between the average of the output signals of the temperature sensors in the grain and the ambient air temperature outside the silo. The control unit will normally be a programmed microprocessor or programmed mini-computer which generates an output signal which, in turn, is used to adjust a flow control device, so that the actual flow rate of the fumigant-containing gas is substantially the calculated value of $Q_f$.

It will be appreciated that if the fumigant is added to its carrier gas (usually air) after the required flow rate has been determined, the input of fumigant into the carrier gas has to be varied in parallel with the variations in the flow rate of the carrier gas, to maintain the predetermined concentration of fumigant within the silo, which is based upon toxicological considerations.

A practical full-scale implementation of the present invention will now be described, by way of example only, with reference to the accompanying drawings.

DETAILED DESCRIPTION OF THE ILLUSTRATED EMBODIMENT

Figure 1:
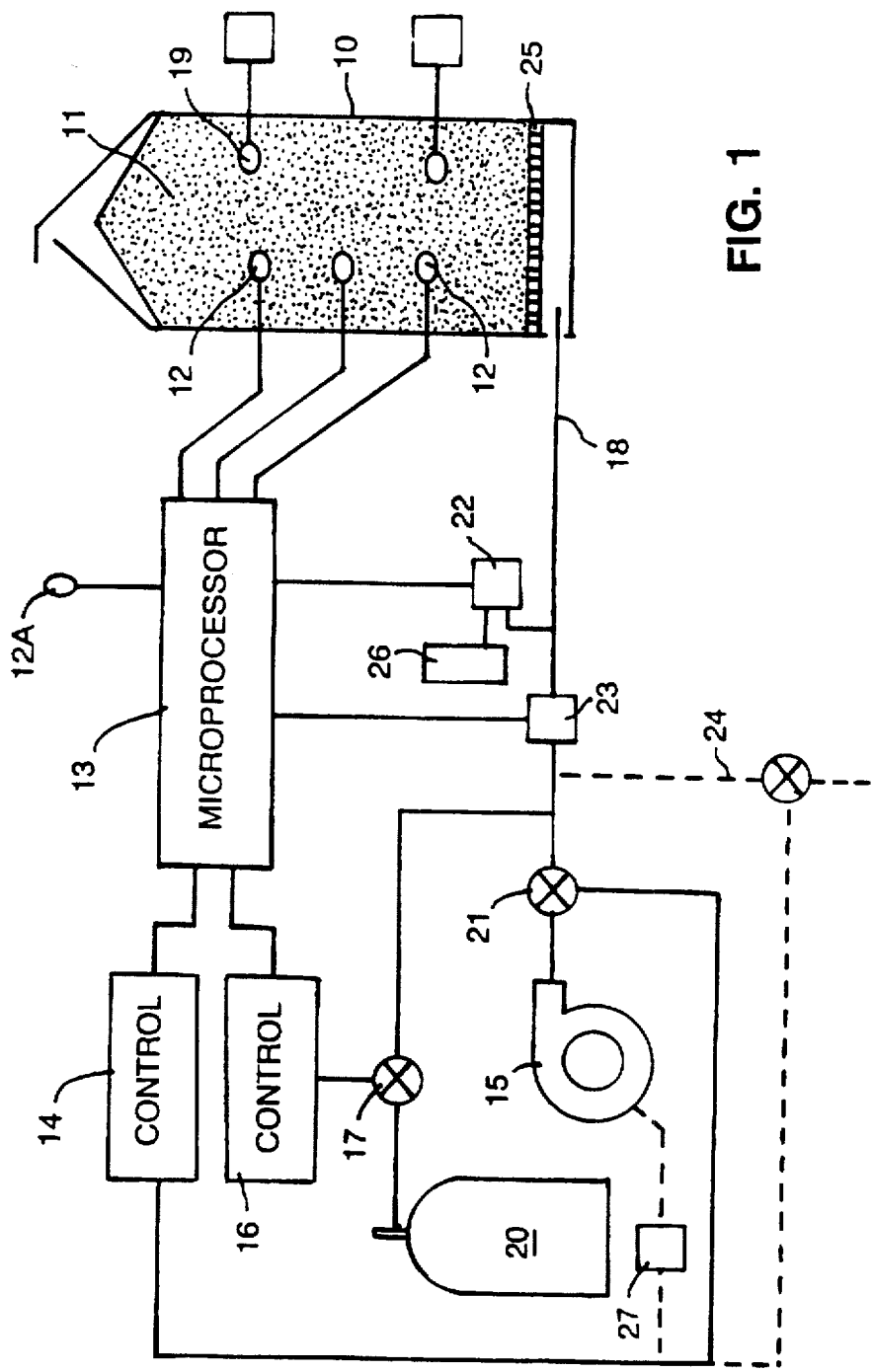
FIG. 1 is a schematic diagram of phosphine supply and control equipment installed for use with a top-vented vertical grain silo.

Full-scale testing of the present invention has been carried out at Wallendbeen, New South Wales, Australia, with a top-ventilated vertical grain silo holding 2,000 tonnes of wheat. The phosphine delivery and control equipment used for this full scale testing is shown in FIG. 1. The tests with this equipment began in February 1994 and are continuing to August 1994 (and possibly beyond that date).

In the arrangement shown in FIG. 1, three temperature sensors 12 (any required number of temperature sensors could be used) are installed to measure the temperature at different locations within the bulk grain 11 stored in the vertical silo 10, and a single temperature sensor 12A monitors the ambient temperature outside the grain silo. The output signals from the temperature sensors are input to a programmed microprocessor 13 (a 386 PC made by Australian Computer Technology Pty Ltd is included in the apparatus installed at Wallendbeen, but any other suitable microprocessor could be used). The microprocessor 13 averages the temperature signals from the sensors 12 and determines the difference between that average signal value and the signal from the temperature sensor 12A. From this difference value, the microprocessor 13 calculates a value of the required flow rate, $Q_f$, of the fumigant-containing gas. When the fumigation is initiated, a predetermining value of $Q_f$ is established.

Figure 2:
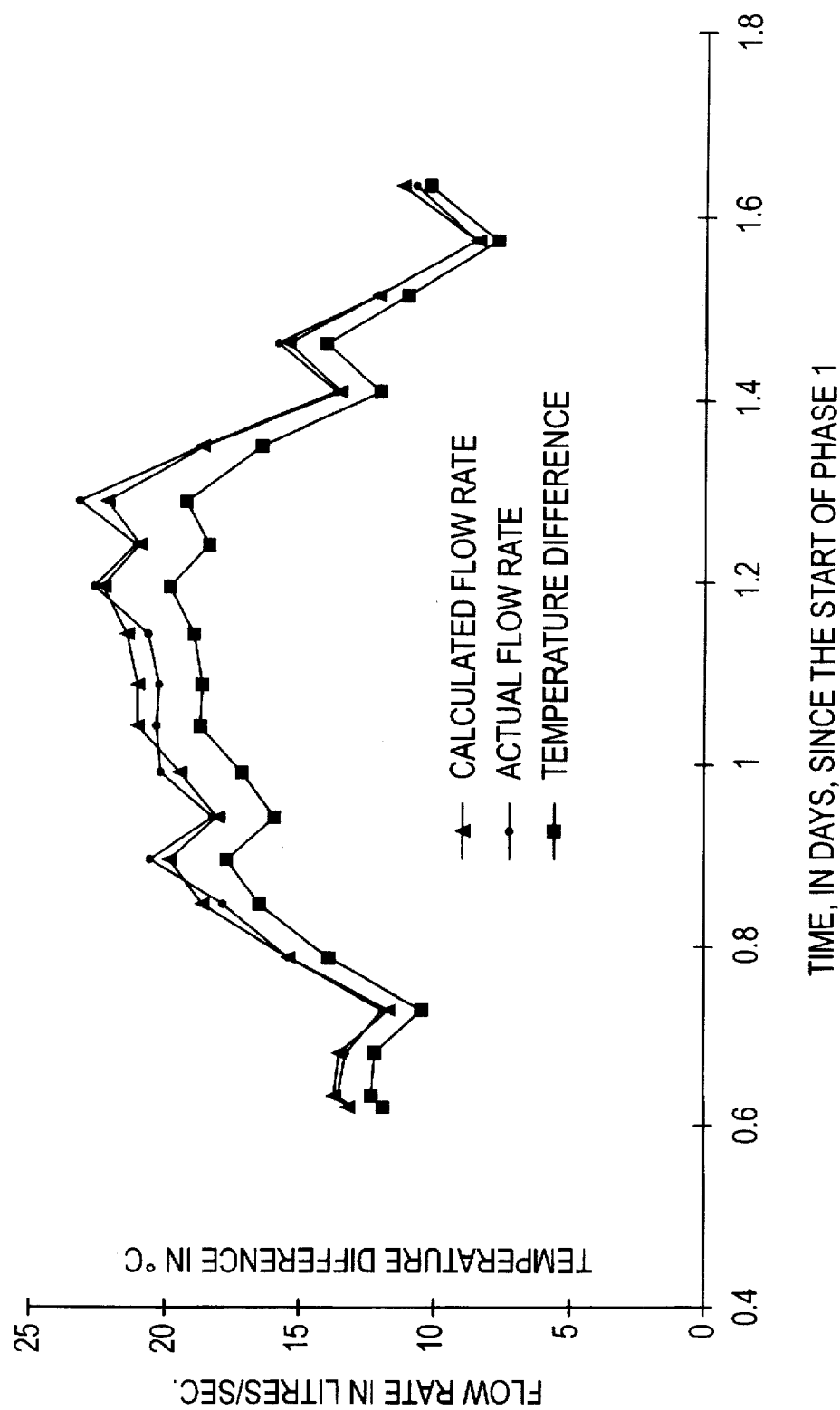
FIG. 2 is a representation, in graph form, of data obtained in one example of the use of the arrangement shown in FIG. 1.

The microprocessor 13 also receives signals from a flow sensor 23 (for example, an ALNOR thermo-anemometer, Model No GGA-26) which is mounted in a duct 18 leading to the base of the silo 10. The microprocessor compares the actual flow rate with its calculated value of $Q_f$. If the actual flow in the duct 18 is greater than the calculated value of $Q_f$, a signal is sent to the controller 14, to cause it to close a valve 21 to reduce the flow of air in the duct 18, which is established by an industrial blower 15. The end of the duct 18 which is remote from the blower 15 is adjacent to a distributor plate (which need not be a horizontal distributor plate 25, as shown in FIG. 2) at the base of the silo 10. If the actual flow of air through the duct 18 is less than the calculated value of $Q_f$, a signal to the controller 14 causes the controller to open the valve 21.

The opening (or closing) of the valve 21 is effected in increments, and is continued until the flow rate in the duct 18 is equal to the calculated value of $Q_f$, whereupon the microprocessor signal to the controller 14 is changed to a value which causes the controller 14 to neither open nor close the valve 21.

The microprocessor 13 also receives a signal from a fumigant concentration sensor 22 (for example, a CO cell manufactured by City Technology in the United Kingdom) which measures the concentration of fumigant in the air flowing through the duct 18. The sensor 22 is not in the duct 18, but receives a sample of the fumigant-containing gas flowing through the duct and obtains the fumigant concentration value of the sample by comparison with a calibrant mixture from a cylinder 26. If the fumigant concentration signal from the sensor 22 shows that the fumigant concentration is below (or above) the required value (the required value is stored in the memory of the microprocessor), the microprocessor 13 sends a signal to the controller 16, to cause it to open (or close) the valve 17, which controls the supply of phosphine from a cylinder 20 (or other source of fumigant—for example, an on-site generator) to the airflow in the duct 18. The opening (or closing) of the valve 17 is continued until the signal from the fumigant concentration sensor 22 indicates that the air flow through the duct 18 contains the required concentration of the fumigant.

It will be clear to agricultural and chemical engineers that the feed-back loops established by the arrangement illustrated in FIG. 1 will be effective to control the settings of the valves 17 and 21 to ensure that at all times when a fumigating gas is blown into the grain mass 11, the concentration of phosphine (or other fumigant) in the gas remains constant as the flow rate of the gas is varied in accordance with the instantaneously calculated value of $Q_f$.

The equipment illustrated in FIG. 1 also includes pressure sensors 19 in the grain mass 11. The pressure sensors 19 (which are each model EMA 84 manometers manufactured by TSE Co Pty Ltd of Melbourne, Australia, in the installation at Wallendbeen) play no part in the fumigant control mechanism. They are used for static pressure measurements which independently measure the validity of the formula used to determine $Q_f$, and the efficacy of the control mechanisms.

The full-scale testing of the present invention involves a series of investigations, each having three phases. In the first phase of each investigation, the gas flow through the grain mass 11 is controlled in accordance with the derived formula for $Q_f$, using the arrangement shown in FIG. 1, for a period of up to five days. Subsequently, in the second phase of the investigation, the flow of fumigating gas through the grain silo is established in accordance with the fumigation technique described and claimed in the specification of Australian patent No 640,669 (which is the patent granted on the Australian patent application derived from International patent application No PCT/AU90/00268). That is, a predetermined flow of fumigant-containing gas, related to the cross-sectional area of the silo, is established. The second phase is also carried out for a period of up to five days. In the third phase of each investigation, the static pressure characteristics within the grain mass are monitored, using a number of pressure sensors 19, in the absence of a gas flow through the duct 18.

Instead of the control arrangement illustrated in FIG. 1, the microprocessor 13 could be programmed (a) to control air flow through a bleed line 24 connected to the duct 18, or (b) to control the setting of a speed control 27 for the blower 15. The second of these two alternative control arrangements, both of which are shown with dashed lines in FIG. 1, is not preferred.

A typical set of data, obtained over one period of 24 hours during a first phase of an observation at Wallendbeen, is shown in graphical form in FIG. 2. The three traces in FIG. 2 show
  (i) the average temperature within the grain mass, as measured by the sensors 12 (the trace with values shown by solid squares);
  (ii) the flow rate through the silo as calculated by the formula for $Q_f$ of the present invention (the trace with values shown by solid triangles); and
  (iii) the actual flow through the silo (the trace with values shown by dots) of air containing a predetermined concentration of phosphine.

These data show clearly the ability of the controlling mechanisms to adjust the flow rate of the fumigant gas in the silo quickly and accurately, and thus demonstrate the suitability of the present invention for use in the fumigation of stored foodstuffs in a top-vented vertical silo in which a chimney effect flow can be expected.

The present invention can also be used in the continuous fumigation of a number of similar silos in a grain storage facility, using a single source of fumigant gas, connected by respective ducts to the silos. To ensure that the charge of each silo is properly fumigated, temperature sensors are installed in each silo, and the controller of the fumigant-containing gas uses the maximum value of the difference between a grain temperature and the ambient air temperature outside the silos of the facility to determine the value of the rate of flow, $Q_f$, of fumigant-containing gas to the silos. With this arrangement, although one (or more) of the silos may receive the fumigant-containing gas at a higher rate than that which is necessary to compensate for the individual chimney effect (or chimney effects), none of the silos will experience a dilution of the fumigant concentration in its associated grain mass.

If the ducts to the silos in the storage facility are not completely symmetrical, then each silo will be provided with the arrangement of orifice plate and control valve that is described, for a multi-silo facility, in the specification of International patent application No PCT/AU90/00268 (WIPO Publication No WO 91/00017).

Although exemplary implementations of the present invention have been described above, it should be appreciated that variations in those implementations may be effected without departing from the present inventive concept. For example, the formulae given in the above description for $Q_f$ and $Q_c$ are correct when the silo is full of the commodity. If the silo is only partially filled with a commodity, the calculated value of $Q_c$ and $Q_f$ needs to be multiplied by a factor $h_s/h_g$, where $h_s$ is the height of the silo and $h_g$ is the height of the commodity in the silo.

We claim:

1. A method of fumigation of a particulate commodity stored in a silo, said method comprising the steps of
   (a) providing a supply of a fumigant-containing gas having a fumigant concentration which is effective to control insect pests in the stored commodity when applied to the stored commodity for an extended period; and
   (b) supplying the fumigant-containing gas to the base of the silo at a flow rate, $Q_f$, which is determined, for a full silo, by the relationship $$Q_f = \frac{g \times P_a}{R \times R_a} \times A \times \left| \frac{1}{T_a} - \frac{1}{T_g} \right|$$

where $Q_f$ is expressed in m$^3$ sec$^{-1}$; g is the acceleration due to gravity; $P_a$ is the atmospheric pressure expressed in Pascals; $R_a$ is the gas constant for air; $T_a$ is the temperature of the air outside the silo, expressed in K; $T_g$ is the temperature of the commodity within the silo, also in K; R is a resistance factor in Pascals sec m$^{-2}$ which depends upon the nature of the stored commodity in the silo; and A is the horizontal cross-sectional area of the silo, in square meters; whereby the possible dilution of the fumigant concentration within the commodity, as a result of the chimney effect, is prevented.

2. A method of fumigation of a particulate commodity stored in a silo, said method comprising the steps of
   (a) providing a supply of a fumigant-containing gas having a fumigant concentration which is effective to control insect pests in the stored commodity when applied to the stored commodity for an extended period;
   (b) ascertaining the maximum value of the difference between the temperature of the commodity within the silo and the ambient air temperature outside the silo which will be experienced for the period of fumigation of the commodity;
   (c) calculating the flow rate $Q_{fmax}$, which is the value of $Q_f$ which is obtained, using the formula $$Q_f = \frac{g \times P_a}{R \times R_a} \times A \times \left| \frac{1}{T_a} - \frac{1}{T_g} \right|$$

where $Q_f$ is expressed in m$^3$ sec$^{-1}$; g is the acceleration due to gravity; $P_a$ is the atmospheric pressure expressed in Pascals; $R_a$ is the gas content for air; $T_a$ is the temperature of the air outside the silo, expressed in K; $T_g$ is the temperature of the commodity within the silo, also in K; R is a resistance factor in Pascals sec m$^{-2}$ which depends upon the nature of the stored commodity in the silo; and A is the horizontal cross-sectional area of the silo, ikn square meters; when said maximum temperature difference is used to determine $Q_f$; and
   (d) supplying said fumigant-containing gas to the base of the silo at a constant rate of $Q_{fmax}$;
whereby said method of fumigation may be performed unattended without a possible reduction of the fumigant concentration in said commodity, due to the chimney effect, to a value below the minimum fumigant concentration that is required for effective fumigation of said commodity.

3. A fumigation method as defined in claim 1, in which the supply of fumigant-containing gas to the base of the silo is effected continuously by a control mechanism which includes a programmed microprocessor or a programmed computer that is responsive to signals corresponding to the instantaneous values of $T_a$ and $T_g$.

4. A fumigation method as defined in claim 1 in which there is a predetermined minimum value of said flow rate, which is maintained when the calculated value of $Q_f$ is less than said minimum flow rate value.

5. A method of fumigation of a plurality of silos in a storage facility, each silo in said facility containing a respective particulate commodity, said method comprising the steps of
   (a) providing a supply of a fumigant-containing gas having a fumigant concentration which is effective to control insect pests in the stored commodity or commodities; and
   (b) monitoring the temperature, $T_g$, of the commodity in each silo and also the ambient air temperature, $T_a$, outside the silos, and determining the maximum value of the difference between the temperature of a stored commodity and said ambient air temperature; and
   (c) supplying the fumigant-containing gas to the bases of the silos at a flow rate, $Q_f$, which is determined by the relationship $$Q_f = \frac{g \times P_a}{R \times R_a} \times A \times \left| \frac{1}{T_a} - \frac{1}{T_g} \right|$$

where $Q_f$ is expressed in m$^3$ sec$^{-1}$; g is the acceleration due to gravity $P_a$ is the atmospheric pressure expressed in Pascals; $R_a$ is the gas constant for air; $T_a$ is the temperature of the air outside the silos, expressed in K; $T_g$ is the temperature of a commodity in a silo which differs most from $T_a$, also in K; R is a resistance factor in Pascals sec m$^{-2}$ which depends upon the nature of the stored commodities in the silos; and A is the sum of the horizontal cross-sectional areas of the silos, in square meters;
whereby the possible dilution of the fumigant concentration in any silo in the facility to a value below that required for effective fumigation of the stored commodity, due to the chimney effect, is prevented.

6. A fumigation method as defined in claim 1 in which the commodity is grain.

7. A fumigation method as defined in claim 1, in which the fumigant in the fumigant-containing gas is phosphine.

8. Apparatus for fumigating a particulate commodity which is stored in a silo, said apparatus comprising:
   (a) means for pumping a fumigant-containing gas into the base of the silo;
   (b) first temperature sensing means positioned within the commodity in the silo and having a first output signal indicative of the temperature within the stored commodity;

(c) second temperature sensing means positioned outside the silo and having a second output signal indicative of the ambient air temperature outside the silo;

(d) processing means adapted to receive said first and second output signals and generate at least one control signal; said at least one control signal being input to control means; said control means being adapted to control the rate at which the fumigant-containing gas is pumped by said pumping means so that the rate of flow of the fumigant-containing gas into the silo has a value, $Q_f$, which is determined, for a full silo, by the relationship $$Q_f = \frac{g \times P_a}{R \times R_a} \times A \times \left| \frac{1}{T_a} - \frac{1}{T_g} \right|$$

where $Q_f$ is expressed in m$^3$ sec$^{-1}$; g is the acceleration due to gravity; $P_a$ is the atmospheric pressure expressed in Pascals; $R_a$ is the gas constant for air; $T_a$ is the temperature of the air outside the silo, expressed in K; $T_g$ is the temperature of the commodity within the silo, also in K; R is a resistance factor in Pascals sec m$^{-1}$ which depends upon the nature of the commodity in the silo; and A is the horizontal cross-sectional area of the silo, in m$^2$.

9. Fumigation apparatus as defined in claim 8, in which (a) said control means comprises (i) a first valve in a duct extending from an air blower to the base of the silo and (ii) a second valve in a line extending from a pressurised source of fumigant gas to said duct;

(b) said control means controls said first valve to establish a flow rate of air into said silo in accordance with the calculated value of $Q_f$; and (c) said control means controls said second valve to maintain a predetermined concentration of fumigant in the air flowing through said duct.

10. Apparatus for fumigating a plurality of silos in a storage facility, each of said silos containing a particulate commodity, said apparatus comprising:

(a) means for pumping a fumigant-containing gas from a single source into the base of each silo;

(b) a respective first temperature sensing means positioned within the commodity in each silo, each of said first temperature sensing means having a respective first output signal indicative of the temperature, $T_g$, of its associated commodity;

(c) second temperature sensing means positioned outside the silos and having a second output signal indicative of the ambient air temperature, $T_a$, outside the silo;

(d) processing means operatively connected to said temperature sensing means and to control means, said processing means being adapted to receive said first output signals and said second output signal and determine the maximum difference between the temperature of a commodity and the ambient air temperature, and to generate a control signal, said control signal being input to said control means; said control means being adapted to control the rate at which said gas pumping means pumps the fumigant-containing gas into the silos so that the rate of flow of the fumigant-containing gas into the silos has a value, $Q_f$, which is calculated using the formula $$Q_f = \frac{g \times P_a}{R \times R_a} \times A \times \left| \frac{1}{T_a} - \frac{1}{T_g} \right|$$

where $Q_f$ is expressed in m$^3$ sec$^{-1}$; g is the acceleration due to gravity; $P_a$ is the atmospheric pressure expressed in Pascals; $R_a$ is the gas constant for air; $T_a$ is the temperature of the air outside the silos, expressed in K; $T_g$ is the temperature of a commodity in a silo which differs most from $T_a$, also in K; R is a resistance factor in Pascals sec m$^{-2}$ which depends upon the nature of the stored commodities in the silos; and A is the sum of the horizontal cross-sectional areas of the silos, in square meters.

11. Fumigation apparatus as defined in claim 8, in which said processing means is a programmed microprocessor or a programmed computer.

12. Fumigation apparatus as defined in claim 8, including means to maintain a predetermined minimum value of said flow rate when the calculated value of $Q_f$ is less than said minimum flow rate value.

13. A fumigation method as defined in claim 1, in which the silo is only partially filled with a commodity, and the calculated value of $Q_f$ is multiplied by a factor f, where $f = h_s/h_g$, $h_s$ is the height of the silo, and $h_g$ is the height of the commodity in the silo.

14. Fumigation apparatus as defined in claim 8, in which the silo is only partially filled with a commodity, and the calculated value of $Q_f$ is multiplied by a factor f, where $f = h_s/h_g$, $h_s$ is the height of the silo, and $h_g$ is the height of the commodity in the silo.

15. A fumigation method as defined in claim 5, in which each silo is only partially filled with a commodity, and the calculated value of $Q_f$ is multiplied by a factor f, where $f = h_s/h_g$, $h_s$ is the height of the silo, and $h_g$ is the height of the commodity in the silo.

16. Fumigation apparatus as defined in claim 10, including means to maintain a predetermined minimum value of said flow rate when the calculated value of $Q_f$ is less than said minimum flow rate value.

17. Fumigation apparatus as defined in claim 10, in which each silo is only partially filled with a commodity, and the calculated value of $Q_f$ is multiplied by a factor f, where $f = h_s/h_g$, $h_s$ is the height of the silo, and $h_g$ is the height of the commodity in the silo.

18. A fumigation method as defined in claim 1, in which the commodity is selected from the group consisting of commodities listed in the table below, and R is the value of R calculated for said commodity and is also listed in the table below:

| Commodity | R |
| --- | --- |
| Alfalfa | 16,318 |
| Barley | 1,676 |
| Clover, alsike | 27,263 |
| Clover, crimson | 10,455 |
| Clover, red | 17,626 |
| *Corn, clean ear | 6.19 |
| *Corn, ear, as harvested | 128 |
| Corn, shelled | 719 |

| Commodity | R |
|---|---|
| Fescue | 4,722 |
| Flax | 10,421 |
| Grass seed, brome | 1,535 |
| Grass seed, rescue | 709 |
| Kobe Lespedeza | 3,167 |
| Lupin seed, blue | 512 |
| Oats | 1.816 |
| *Pea beans | 435 |
| *Peanuts in shell | 29.0 |
| Popcorn, shelled, yellow pearl type | 1,046 |
| Popcorn, white rice type | 1,766 |
| Rice, rough | 1,952 |
| Sericea Lespedeza | 16,318 |
| Sorghum, grain | 2,664 |
| Soybeans | 646 |
| Wheat | 3,131 |
| Linseed, glenelg | 14,907 |
| Rapeseed, tower | 7,097 |
| Safflower, gila | 1,207 |
| Sunflower, commercial crushing | 1,593 |

*Approximate value

* * * * *